(12) United States Patent
Soltanmohammadi et al.

(10) Patent No.: US 10,902,579 B1
(45) Date of Patent: Jan. 26, 2021

(54) CREATING AND TUNING A CLASSIFIER TO CAPTURE MORE DEFECTS OF INTEREST DURING INSPECTION

(71) Applicant: KLA-Tencor Corporation, Milpitas (CA)

(72) Inventors: Erfan Soltanmohammadi, Felton, CA (US); Martin Plihal, Pleasanton, CA (US); Tai-Kam Ng, San Jose, CA (US); Sang Hyun Lee, Clifton Park, NY (US)

(73) Assignee: KLA-Tencor Corporation, Milpitas, CA (US)

( * ) Notice: Subject to any disclaimer, the term of this patent is extended or adjusted under 35 U.S.C. 154(b) by 116 days.

(21) Appl. No.: 16/188,674

(22) Filed: Nov. 13, 2018

(51) Int. Cl.
*G06T 7/00* (2017.01)
*G06N 3/08* (2006.01)
*G06N 3/04* (2006.01)
*G06K 9/62* (2006.01)

(52) U.S. Cl.
CPC ............ *G06T 7/0004* (2013.01); *G06K 9/626* (2013.01); *G06K 9/628* (2013.01); *G06N 3/04* (2013.01); *G06N 3/08* (2013.01); *G06T 2207/20081* (2013.01); *G06T 2207/30148* (2013.01)

(58) Field of Classification Search
CPC .......... G06K 9/626; G06K 9/628; G06N 3/04; G06N 3/08; G06T 2207/20081; G06T 2207/30148; G06T 7/0004
See application file for complete search history.

(56) References Cited

U.S. PATENT DOCUMENTS

| | | | |
|---|---|---|---|
| 2011/0188735 A1* | 8/2011 | Hosoya | G01N 21/956 382/149 |
| 2012/0117010 A1* | 5/2012 | Ono | G06T 7/001 706/20 |
| 2012/0293795 A1* | 11/2012 | Urano | G01N 21/9501 356/237.5 |
| 2019/0197679 A1* | 6/2019 | Fang | G06T 7/97 |

* cited by examiner

*Primary Examiner* — Leon Flores
(74) *Attorney, Agent, or Firm* — Hodgson Russ LLP (57) ABSTRACT

Defects of interest can be captured by a classifier. Images of a semiconductor wafer can be received at a deep learning classification module. These images can be sorted into soft decisions with the deep learning classification module. A class of the defect of interest for an image can be determined from the soft decisions. The deep learning classification module can be in electronic communication with an optical inspection system or other types of semiconductor inspection systems.

14 Claims, 6 Drawing Sheets

CREATING AND TUNING A CLASSIFIER TO CAPTURE MORE DEFECTS OF INTEREST DURING INSPECTION

FIELD OF THE DISCLOSURE

This disclosure relates to classification of defects during semiconductor manufacturing.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Defect review is a process by which a user reviews defects acquired by a wafer inspection tool. Defect review includes the classification of defects and the differentiation or separation of defect types based on a set of defect attributes. However, previous defect classification approaches have a number of limitations. Previous manual approaches involve the visual analysis of one or more scanning electron microscope (SEM) images during a human review process that assigns a class code based on the type of defect that is observed. Such a manual review and classification process suffers from disadvantages. First, images are typically classified at less than 1000 defects per hour by user. Given that a typical sample size can be greater than 4000 defects, the manual classification process is too slow for the semiconductor manufacturing industry. In addition, this process is user-intensive and susceptible to human error.

Decision trees for defect classification are often manually created using calculated attributes, which is a time-consuming process. In this case, a user has to select the best attributes for each node of a decision tree from a large number (e.g., greater than 80) of attributes. In addition, the tree size may become large (e.g., greater than 50 nodes). The quality of a manually-created tree is related to a user's interpretation and understanding of the available attributes and the decision tree creation process. Furthermore, previous approaches to measure defect type separability are limited. Previously, a user manually found the best attributes for type pairs to separate two defect types. These previous approaches to classifier monitoring are still time-consuming and complex.

Machine learning approaches have been considered for defect classification and nuisance filtering for optical wafer inspection, but ground truth has been notoriously inconsistent and inaccurate for training and evaluation. Frequently, multiple defect (e.g., nuisance) types go into a single bin (e.g., classification category). Some of the types in the bin are more important than others. Thus, some defects have different capture rate requirements.

Figure 1:
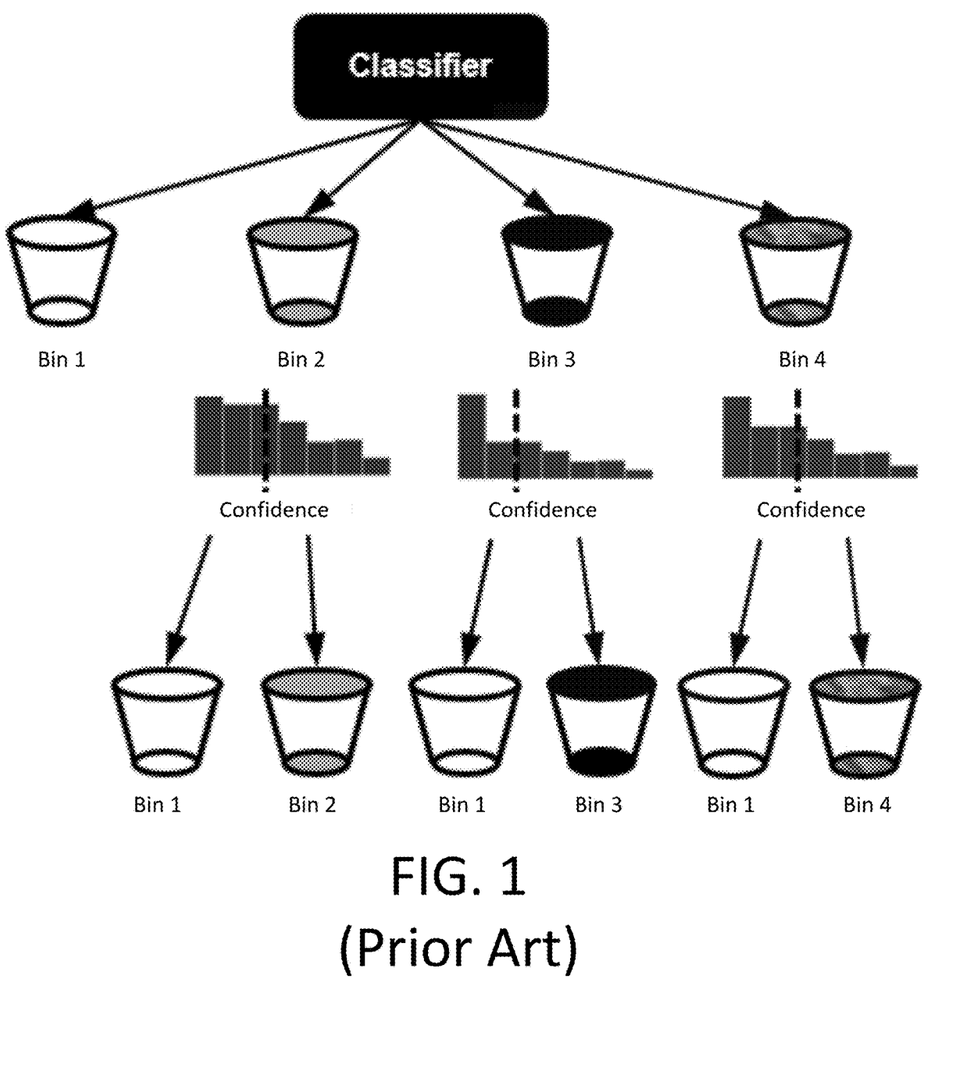
FIG. 1 is a flowchart illustrating a previous confidence-based tuning method to obtain more DOIs.

In a previous method for obtaining more defects of interest (DOIs), one bin was created per defect and nuisance type and assigned a bin code (rough bin) according to the desired binning criteria. Then low confidence defects were moved from the other bins to the DOI bin. This approach does not allow selective modification of discrimination boundaries for individual defect types. FIG. 1 shows an example for this approach for four bin classification where bin 1 is for DOI. Shading and labeling of the bins is common between the original binning and the binning based on confidence levels. Here, the user designates a cutline for the low confidence defects in bins 2, 3, and 4 and moves the low confidence defects to bin 1 to obtain more DOIs. However, when the user designates the cutline on a bin (e.g., bin 2), then all of the low confidence defects go to the DOI bin. There may be a large number of defects with low confidence that belong to bin 3 and bin 4 instead of bin 1, but all of them are put in bin 1. By using this approach, the user lacks control over transferring the defects that belong to bin 1. Furthermore, bin 1 may have different defect types by itself. If the user is interested in a few the defect types, the confidence-based method lacks capability to increase the capture rate of only few specific defect types.

Thus, previous methods move defects between bins only with the help of the confidence of classifier. Unless the previous methods are being used with only two bins, then this has many disadvantages.

First, creating one bin per defect type creates a complicated model with multiple and unnecessary classification boundaries. This produces more instability. Such a model is impossible to tune for capture rate and nuisance rate.

Second, low confidence defects in a bin have a higher probability of belonging to the other defect types (bins), but there is no way in the previous methods to distinguish which bin these low confidence defects belong to.

The user is typically more interested in one or more types of DOIs. For example, catching open defects may be important for a user. The user typically wants an efficient way to find more DOIs of those types. Using previous methods, the user moves the cutline on other bins to much larger values to ensure that they are going to bring more types of defects to the DOI bin. Thus, if a bin contains multiple defect types as it almost always does, then there is no way to enhance the capture of a particular type in the bin with previous methods.

Therefore, improved techniques for defect classification are needed.

BRIEF SUMMARY OF THE DISCLOSURE

A system is provided in a first embodiment. The system includes an interface module in electronic communication with a wafer inspection tool and a deep learning classification module in electronic communication with the interface module. The deep learning classification module is configured to receive a plurality of images of a semiconductor wafer via the interface module; sort defects on the images into a plurality of soft decisions; apply a weight to each of the soft decisions thereby determining a value for each of the soft decisions; and determine a class of the defect of interest for the image based on the value. Each of the soft decisions is for a defect of interest type.

The system can further comprise the wafer inspection tool. The wafer inspection tool can be configured to generate the images. The wafer inspection tool may be one of an optical wafer inspection tool or an electron beam wafer inspection tool. The wafer inspection tool can include a stage that holds a semiconductor wafer and a detector.

The deep learning classification module can be trained with a training set of defects of interest.

The deep learning classification module can be further configured to normalize the soft decisions thereby determining normalized soft decisions. The weight may be applied to the soft decision by multiplying the normalized soft decisions by the weight corresponding to the soft decision.

In an instance, the deep learning classification module determines the class of the defect of interest by adding the value for each of the soft decisions thereby determining a summation and determining if the summation has a largest value among all the classes. The summation with the largest value is the class for the defect of interest.

The deep learning classification module can be configured such that the weight is adjustable.

A method is provided in a second embodiment. In the method, a plurality of images of a semiconductor wafer are received at a deep learning classification module. Defects on the images are sorted into a plurality of soft decisions with the deep learning classification module. Each of the soft decisions is for a defect of interest type. A weight is applied to each of the soft decisions using the deep learning classification module thereby determining a value. Using the deep learning classification module, a class of the defect of interest for the image is determined based on the value.

The method can further comprise training the deep learning classification module with a training set of defects of interest.

The method can further comprise normalizing the soft decisions with the deep learning classification module thereby determining normalized soft decisions. The weight can be applied to the soft decision using the deep learning classification module by multiplying the normalized soft decisions by the weight corresponding to the soft decision.

In an instance, the determining includes adding the value for each of the soft decisions thereby determining a summation and determining if the summation has a largest value among all the classes. The summation with the largest value is the class for the defect of interest.

The method can further comprise adjusting the weight. A number of the images in the class can change as the weight is adjusted.

The method can further comprise generating the images of the semiconductor wafer with an optical inspection tool.

A non-transitory computer readable medium can store a program configured to instruct a processor to execute the method of an instance of the second embodiment.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein can eliminate the sensitivity of nuisance filters and defect binners to the way defects are classified by human users or automatic defect classifiers (ADC) of SEM images, while at the same time still allowing preferential tuning to selected defect types. Embodiments disclosed herein enable prioritization of defect types in a single classification category according to goals and expectations of a semiconductor manufacturer or other user. The capture rate of the DOI or DOIs among all the defect types in the inspection is increased. Embodiments disclosed herein also can be used in discovery of defects, binning of defects, and nuisance filtering. Embodiments disclosed herein can provide evaluation of performance in advance and selection of a desired operating point.

The disclosed embodiments can provide a methodology to create a group classifier from a type classifier. This transformation can preserve all the statistical properties of the class classifier, like consistency. It also increases the capture of DOI types in inspection, classification, nuisance filtering, and/or discovery while keeping the nuisance and other insignificant DOIs rates minimal. The number of nuisance brought to the inspection is less than the previous techniques because the capture rate of the target DOI can be precisely amplified. The disclosed embodiments can be tuned and can be applied to all machine learning approaches. Furthermore, the disclosed embodiments offer a tuning approach for multi-bin models.

Rather than changing the confidence level to determine DOI, embodiments disclosed herein change the weights on a particular defect class or DOI. By changing the weights, different defect classes or DOI are binned together. Changing the weights also can bin more defects together that are likely the DOI.

Figure 2:
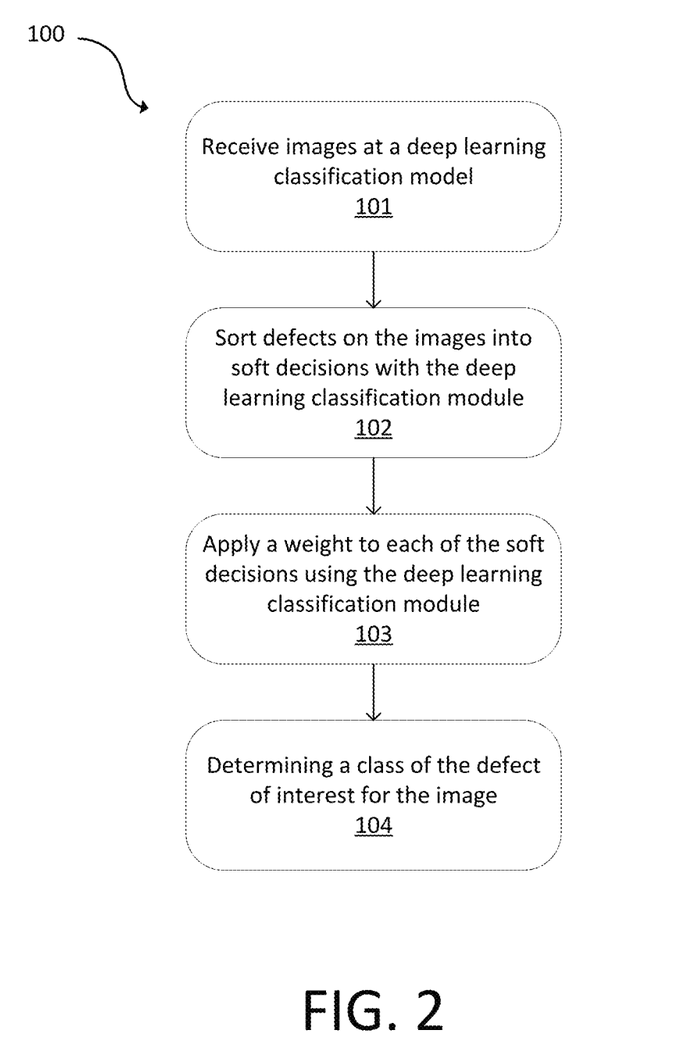
FIG. 2 is a flowchart of an embodiment of a method in accordance with the present disclosure.

FIG. 2 is a flowchart of an embodiment of a method 100. At 101, images of a semiconductor wafer are received at a deep learning classification module. This may include thousands of images. The larger number of images, then the better the classifier can be trained. The images can be generated by an optical inspection tool, such as an optical inspection tool that uses a laser, lamp, or broadband plasma (BBP). SEM images also may be used.

Defects on the images are sorted at 102 into a plurality of soft decisions with the deep learning classification module. Each of the soft decisions is for a DOI type. The DOI type can be applied using class codes. The soft decision may be for a defect that has a particular confidence level to be in a particular bin, but can still be classified in any bin.

With respect to the soft decisions, the deep learning classification module can provide its decision as a continuous number rather than a predicted label. This continuous number is known as the "soft decision." For example, in binary classification the classifier gives a continuous number between 0 and 1 rather than a label of 0 or 1. Then, this continuous number can be transformed to a label. For example, if the soft decision is less than 0.5 then the predicted label is 0 and if it is greater than or equal to 0.5 then the label is 1.

The DOI types can include bridge defects, open defects, short defects, missing vias, hugging gates, missing contacts, scratches, particles, shrunken vias, residue, or other types of defects. Techniques disclosed herein provide acceptable performance for any of these defect types.

A weight is applied to each of the soft decisions using the deep learning classification module at 103. Applying the weight can be used to determine a value. The weight can be adjusted. The weight can adjust the probability so that a soft decision is in any particular bin. Adjusting the weight can reduce the nuisance rate.

Changing the weight can change the mixture of types of defects in a particular bin. For example, bridge defects can be weighted more heavily, which can increase the number likely bridge defects that are outputted as DOI. The weights may not be applied to a particular bin. Rather, the weights can be changed to gain a particular output DOI. Using the weights in such a manner will result in better purity and increase the number of target defects with fewer number of nuisance or other DOI types than previous methods.

Using the deep learning classification module, a class of the DOI for the image is determined based on the value at 104.

In an instance, the soft decisions are normalized with the deep learning classification module thereby determining normalized soft decisions. The weight can be applied to the soft decision by multiplying the normalized soft decisions by the weight corresponding to the soft decision. Determining the class of the DOI can include adding the value for each of the soft decisions thereby determining a summation and determining if the summation has a largest value among all the classes. The summation with the largest value may be the class for the DOI.

The method 100 can be performed by or otherwise using an optical inspection system, such as a broad band plasma system or other optical inspection system.

The method 100 can use a classifier that is trained with labeled data. The classifier can be trained prior to the step 101.

Figure 3:
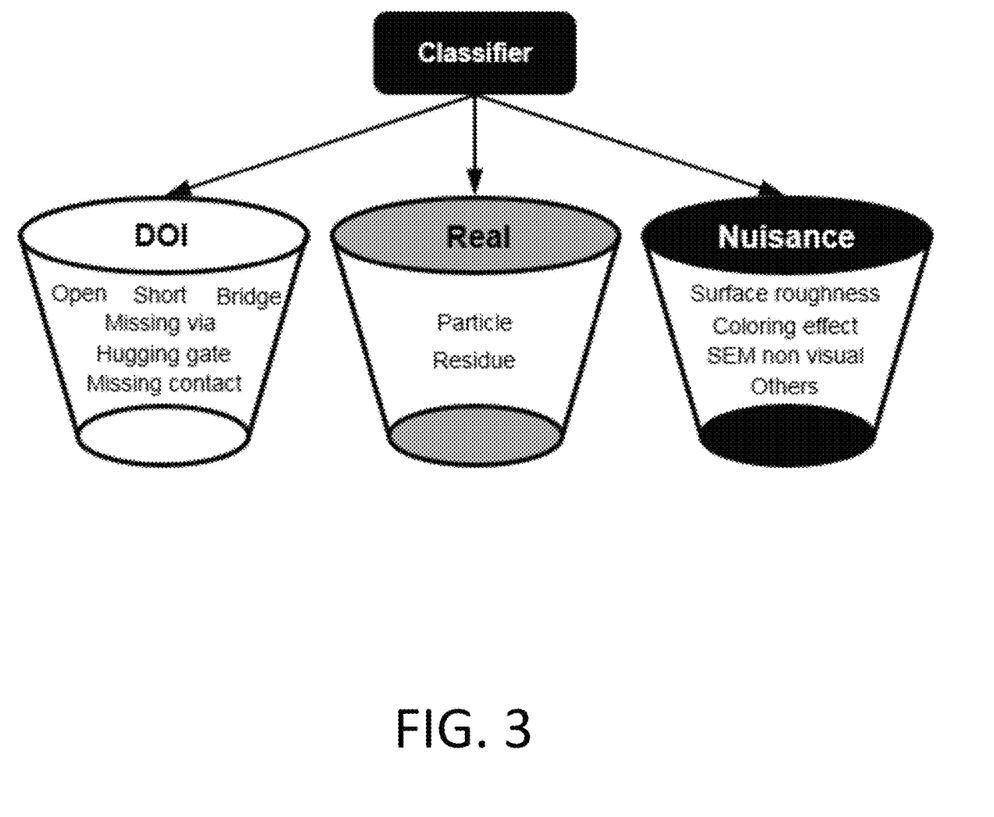
FIG. 3 is a flowchart illustrating an embodiment of grouping in accordance with the present disclosure, wherein each of the three different bins (grouped classes) has its own defect types (classes)

FIG. 3 is a flowchart illustrating an embodiment of grouping. There are different bins (grouped classes) in FIG. 3. Each of the bins has its own different types (classes).

In the example of FIG. 3, the three bins (grouped classes) are DOI, real defects, and nuisance. Each of the bins has different types. DOI includes open, short, bridge, hugging gate, missing via, and missing contact defects. Real defects include particle and residue (external material). Nuisance includes surface roughness, coloring effect, SEM non-visual (SNV), and others.

A user can create a classifier with a number of grouped classes, such as the three groups illustrated in FIG. 3. Using a large number of bins can complicate the classifier and the classification boundaries. Normally, there are not enough training samples (statistics) for all the classes. Therefore, a group may be created for all or the similar types to make enough statistics for them. Using a pure type-based classifier with more bins can result in an unstable solution because normally there are few examples of the target defects in the training set. If the classifier is trained based on class codes (not groups) then the model may not learn the combined characteristics of the DOI against nuisance. As the number of examples for the target DOI is low and it does not use the other types of the DOI, the model would become unstable if there is slight movement in the distributions of the defect clouds.

Instead of creating the classifier using grouped classes, the classifier can be created using classes. In this manner, the classifier can learn about types (classes), and can be used for group classification. Once the classifier is built based on types, a higher aggregation layer can be created to combine the classification result of the classifier to form a group classifier.

Figure 6:
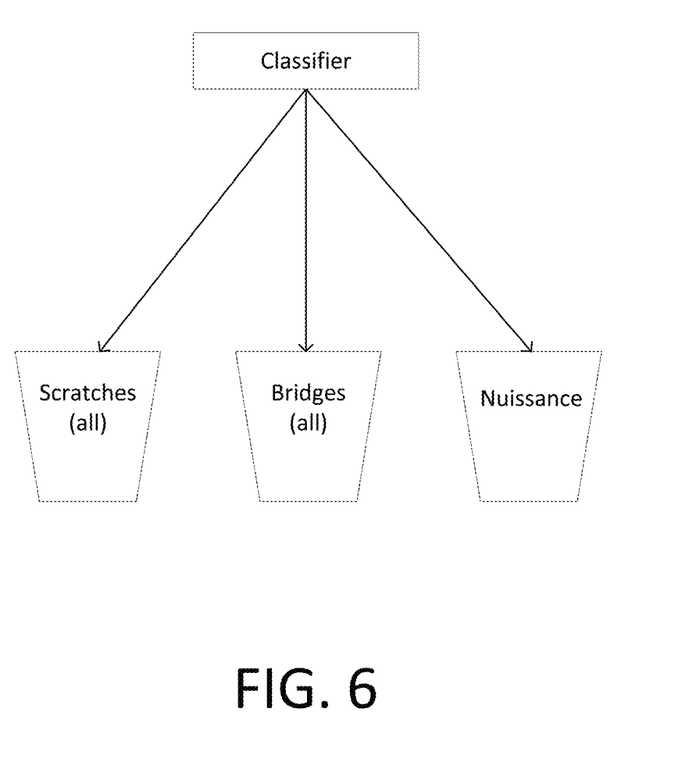
FIG. 6 is another flowchart illustrating an embodiment implementing the method of FIG. 2.

FIG. 6 is another flowchart illustrating an embodiment implementing the method of FIG. 2. In an example, 20% of defects are in the scratches bin, 70% of defects are in the bridges bin, and 10% of defects are in the nuisance bin. To increase bridge capture, previous methods would move low confidence scratches to the bridge bin. That could lead to a lack of purity. Embodiments disclosed herein increase weight on the bridge bin to draw bridges from the scratches and nuisance bins. This has less of a purity problem because the defects being drawn to the bridges bin are not just low confidence defects. By using weights, these are defects that have a soft decision of a bridge.

Other than a hard decision outputs, some classifiers explicitly output a soft measure. One example is softmax in deep learning. It also can be in the form of vote, soft decision, or distance measure from the boundaries. For classifiers that do not output a soft measure, a distance to classes can be used as a soft decision. These soft decisions can be used to create a group classifier out of the type classifier.

In an instance, all the soft decision are normalized to be in range of [0, 1]. Next, for each class, a weight is defined. A weight can have any value from 0 to 1 or to an even larger number. A weight of 0 can mean that no defects of that type are collected. As the weight increases toward 1 then the odds of that type of defect being collected will increase. Given a defect, the normalized soft decision for each type (class) is multiplied by the corresponding weight to create the decision rule for the group based classifier. Then, for each group, these values are added for its classes. Then whether a defect belong to a class may be based on if this summation has the largest value among all the classes.

Using this methodology, a user can tune the classifier toward specific DOI types to capture more of it in the inspection, binning, classification, and/or nuisance filtering. Furthermore, the user can use higher weights to capture more of a particular DOI. This approach is efficient because it minimizes the number of nuisance and other insignificant types. The user can use bin accuracy, bin purity, capture histogram, true positive rate, false positive rate, capture rate, nuisance rate, or a receiver operating characteristic (ROC) curve to tune the weights and achieve a desirable performance.

Figure 4:
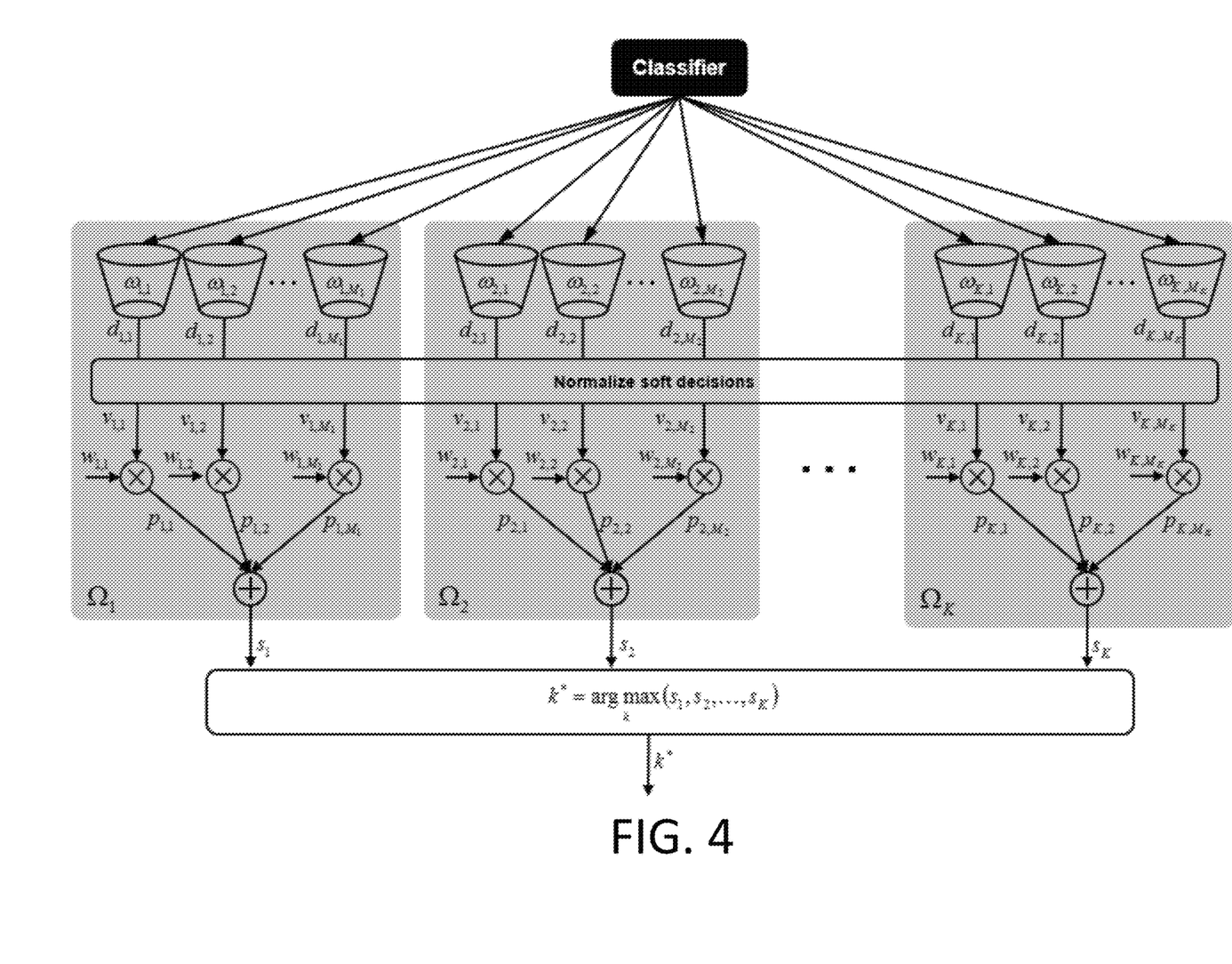
FIG. 4 is a flowchart illustrating an embodiment implementing the method of FIG. 2.

In an example, there are K groups denoted by $\Omega_1, \Omega_2, \ldots, \Omega_K$. In this example, type $\Omega_k$ (group) has $M_k$ types (classes) denoted by $\omega_{k,1}, \omega_{k,2}, \ldots, \omega_{k,M_k}$. Therefore, the total number of types (classes) would be $$M = \sum_{k=1}^{K} M_k.$$

The classified can be based on the M types (classes). The soft decisions of the classifier $\omega_{k,m}$ can be denoted by $d_{k,m}$ where $d_{k,m} \in [d_{min}, \infty)$. The soft decision of the classifier can be normalized so that the output is between 0 and 1. Softmax in deep learning is an example of a technique that can be used to normalize the soft decision. Normalization can use Equation 1.

$$v_{k,m} = \frac{d_{k,m} - d_{min}}{\sum_{i=1}^{K} \sum_{j=1}^{M} (d_{i,j} - d_{min})} \quad \text{Eq. 1}$$

A desired weight can be associated with each type (class). For example, the weight for each type $\omega_{k,m}$ can be denoted by $w_{k,m}$ where $w_{k,m} \in [1, \infty)$. The normalized soft decisions can be multiplied with the corresponding weights to obtains a weighted soft decision such as $p_{k,m} = w_{k,m} v_{k,m}$. All the weight votes of the types (classes) that belong to a class can be added to obtain the aggregated weighted soft decision for that group, such as using Equation 2.

$$s_k = \sum_{m=1}^{M} p_{k,m} \quad \text{Eq. 2}$$

The decision rule for group classification may be the group that has the highest value, such as using Equation 3.

$$k^* = \underset{k}{\operatorname{argmax}}(s_1, s_2, \ldots, s_K) \quad \text{Eq. 3}$$

k* in Equation 3 is a winner group or final decision.

FIG. 4 is a flowchart illustrating an embodiment implementing the method of FIG. 2 and the previous example.

Using the embodiment of FIG. 2, FIG. 4, or FIG. 6 can provide a methodology to create group classifier from type classifier. As disclosed herein, this methodology can be tuned. This transformation preserves all the statistical properties of the class classifier, like consistency. It also increases the capture of important DOI types in inspection, classification, nuisance filtering, and/or discovery while keeping the nuisance and other insignificant DOIs rates minimal.

Embodiments disclosed herein, such as the embodiments of FIG. 2, FIG. 4, or FIG. 6 are more stable that previous techniques.

Embodiments disclosed herein, such as the embodiments of FIG. 2, FIG. 4, or FIG. 6 also have a better DOI capture rate that previous techniques. In testing, the DOI capture rate was 10% to 20% improved compared to previous techniques. The nuisance rate during testing was approximately the same using embodiments disclosed herein and the previous techniques.

In another instance, only two bins are provided. These two bins may be the target DOI and other defects. Weights can be applied to certain class codes such that only the desired class codes are in the bin for the target DOI.

Figure 5:
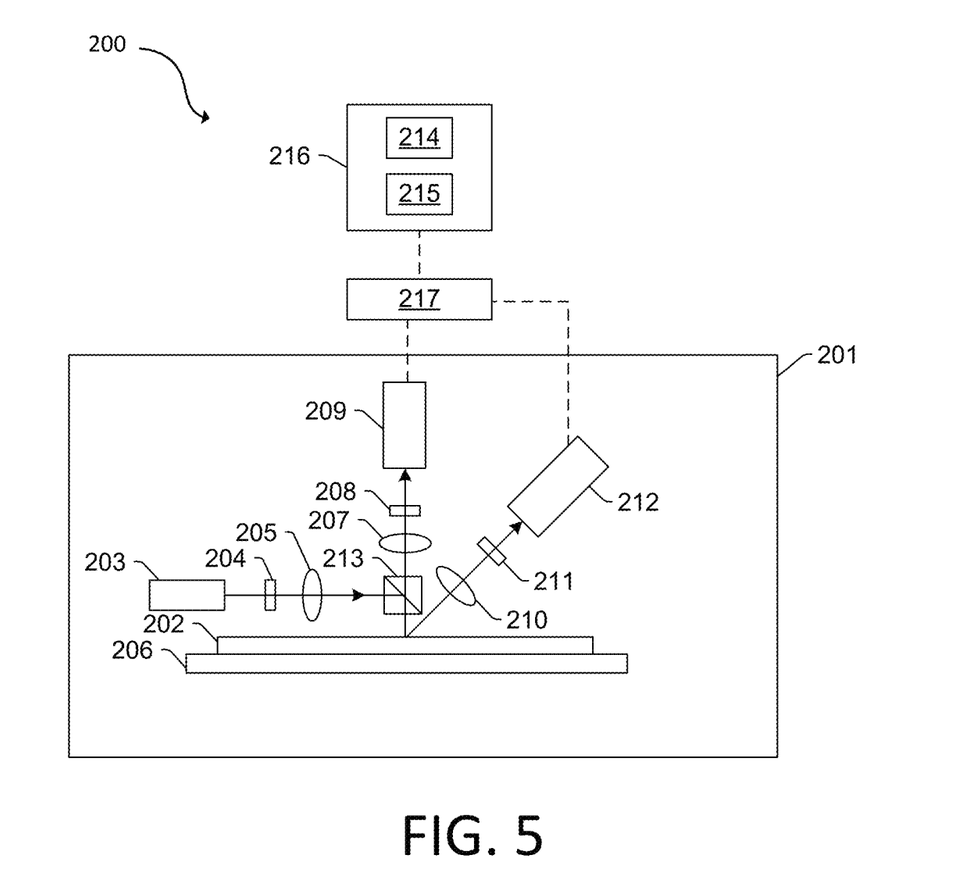
FIG. 5 is a block diagram of an exemplary system in accordance with the present disclosure.

One embodiment of a system 200 is shown in FIG. 5. The system 200 includes optical based subsystem 201. In general, the optical based subsystem 201 is configured for generating optical based output for a specimen 202 by directing light to (or scanning light over) and detecting light from the specimen 202. In one embodiment, the specimen 202 includes a wafer. The wafer may include any wafer known in the art. In another embodiment, the specimen includes a reticle. The reticle may include any reticle known in the art.

In the embodiment of the system 200 shown in FIG. 5, optical based subsystem 201 includes an illumination subsystem configured to direct light to specimen 202. The illumination subsystem includes at least one light source. For example, as shown in FIG. 5, the illumination subsystem includes light source 203. In one embodiment, the illumination subsystem is configured to direct the light to the specimen 202 at one or more angles of incidence, which may include one or more oblique angles and/or one or more normal angles. For example, as shown in FIG. 5, light from light source 203 is directed through optical element 204 and then lens 205 to specimen 202 at an oblique angle of incidence. The oblique angle of incidence may include any suitable oblique angle of incidence, which may vary depending on, for instance, characteristics of the specimen 202.

The optical based subsystem 201 may be configured to direct the light to the specimen 202 at different angles of incidence at different times. For example, the optical based subsystem 201 may be configured to alter one or more characteristics of one or more elements of the illumination subsystem such that the light can be directed to the specimen 202 at an angle of incidence that is different than that shown in FIG. 5. In one such example, the optical based subsystem 201 may be configured to move light source 203, optical element 204, and lens 205 such that the light is directed to the specimen 202 at a different oblique angle of incidence or a normal (or near normal) angle of incidence.

In some instances, the optical based subsystem 201 may be configured to direct light to the specimen 202 at more than one angle of incidence at the same time. For example, the illumination subsystem may include more than one illumination channel, one of the illumination channels may include light source 203, optical element 204, and lens 205 as shown in FIG. 5 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen 202 at different angles of incidence may be different such that light resulting from illumination of the specimen 202 at the different angles of incidence can be discriminated from each other at the detector(s).

In another instance, the illumination subsystem may include only one light source (e.g., light source 203 shown in FIG. 5) and light from the light source may be separated into different optical paths (e.g., based on wavelength, polarization, etc.) by one or more optical elements (not shown) of the illumination subsystem. Light in each of the different optical paths may then be directed to the specimen 202. Multiple illumination channels may be configured to direct light to the specimen 202 at the same time or at different times (e.g., when different illumination channels are used to sequentially illuminate the specimen). In another instance, the same illumination channel may be configured to direct light to the specimen 202 with different characteristics at different times. For example, in some instances, optical element 204 may be configured as a spectral filter and the properties of the spectral filter can be changed in a variety of different ways (e.g., by swapping out the spectral filter) such that different wavelengths of light can be directed to the specimen 202 at different times. The illumination subsystem may have any other suitable configuration known in the art for directing the light having different or the same characteristics to the specimen 202 at different or the same angles of incidence sequentially or simultaneously.

In one embodiment, light source 203 may include a BBP source. In this manner, the light generated by the light source 203 and directed to the specimen 202 may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source 203 may also include a polychromatic light source that generates light at multiple discrete wavelengths or wavebands.

The light source 203 can include a BBP source, lamp, or laser. In some embodiments, the light source 203 can emit light, or photons, which can be in the form of infrared, visible, ultraviolet, or x-ray light.

Light from optical element 204 may be focused onto specimen 202 by lens 205. Although lens 205 is shown in FIG. 5 as a single refractive optical element, it is to be understood that, in practice, lens 205 may include a number of refractive and/or reflective optical elements that in combination focus the light from the optical element to the specimen. The illumination subsystem shown in FIG. 5 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 213), aperture(s), and the like, which may include any such suitable optical elements known in the art. In addition, the optical based subsystem 201 may be configured to alter one or more of the elements of the illumination subsystem based on the type of illumination to be used for generating the optical based output.

The optical based subsystem 201 may also include a scanning subsystem configured to cause the light to be scanned over the specimen 202. For example, the optical based subsystem 201 may include stage 206 on which specimen 202 is disposed during optical based output generation. The scanning subsystem may include any suitable mechanical and/or robotic assembly (that includes stage 206) that can be configured to move the specimen 202 such that the light can be scanned over the specimen 202. In addition, or alternatively, the optical based subsystem 201 may be configured such that one or more optical elements of the optical based subsystem 201 perform some scanning of the light over the specimen 202. The light may be scanned over the specimen 202 in any suitable fashion such as in a serpentine-like path or in a spiral path.

The optical based subsystem 201 further includes one or more detection channels. At least one of the one or more detection channels includes a detector configured to detect light from the specimen 202 due to illumination of the specimen 202 by the subsystem and to generate output responsive to the detected light. For example, the optical based subsystem 201 shown in FIG. 5 includes two detection channels, one formed by collector 207, element 208, and detector 209 and another formed by collector 210, element 211, and detector 212. As shown in FIG. 5, the two detection channels are configured to collect and detect light at different angles of collection. In some instances, both detection channels are configured to detect scattered light, and the detection channels are configured to detect tight that is scattered at different angles from the specimen 202. However, one or more of the detection channels may be configured to detect another type of light from the specimen 202 (e.g., reflected light).

As further shown in FIG. 5, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 210, element 211, and detector 212 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 5 shows an embodiment of the optical based subsystem 201 that includes two detection channels, the optical based subsystem 201 may include a different number of detection channels (e.g., only one detection channel or two or more detection channels). In one such instance, the detection channel formed by collector 210, element 211, and detector 212 may form one side channel as described above, and the optical based subsystem 201 may include an additional detection channel (not shown) formed as another side channel that is positioned on the opposite side of the plane of incidence. Therefore, the optical based subsystem 201 may include the detection channel that includes collector 207, element 208, and detector 209 and that is centered in the plane of incidence and configured to collect and detect light at scattering angle(s) that are at or close to normal to the specimen 202 surface. This detection channel may therefore be commonly referred to as a "top" channel, and the optical based subsystem 201 may also include two or more side channels configured as described above. As such, the optical based subsystem 201 may include at least three channels (i.e., one top channel and two side channels), and each of the at least three channels has its own collector, each of which is configured to collect light at different scattering angles than each of the other collectors.

As described further above, each of the detection channels included in the optical based subsystem 201 may be configured to detect scattered light. Therefore, the optical based subsystem 201 shown in FIG. 5 may be configured for dark field (DF) output generation for specimens 202. However, the optical based subsystem 201 may also or alternatively include detection channel(s) that are configured for bright field (BF) output generation for specimens 202. In other words, the optical based subsystem 201 may include at least one detection channel that is configured to detect light specularly reflected from the specimen 202. Therefore, the optical based subsystems 201 described herein may be configured for only DF, only BF, or both DF and BF imaging. Although each of the collectors are shown in FIG. 5 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor, such as processor 214 or another processor, may be configured to generate images of the specimen 202 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 5 is provided herein to generally illustrate a configuration of an optical based subsystem 201 that may be included in the system embodiments described herein or that may generate optical based output that is used by the system embodiments described herein. The optical based subsystem 201 configuration described herein may be altered to optimize the performance of the optical based subsystem 201 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

Additionally, the system in electronic communication with the deep learning classification module 216 can be an electron beam wafer inspection tool that images a specimen with an electron beam. Thus, the system 200 is not limited to optical wafer inspection tools like the system 200.

The deep learning classification module 216 can include a processor 214 and/or electronic data storage unit 215. The deep learning classification module 216 is in electronic communication with an interface module 217. The interface module 217 is in electronic communication with the system 200, which may be a wafer inspection tool. The interface module 217 may be a data port or another device that relays or otherwise provides information to the deep learning classification module 216. The interface module 217 may be part of the system 200 or separate from the system 200.

The processor 214 may be coupled to the components of the system 200 in any suitable manner (e.g., via one or more transmission media, which may include wired and/or wireless transmission media) such that the processor 214 can receive output. The processor 214 may be configured to perform a number of functions using the output. The system 200 can receive instructions or other information from the processor 214. The processor 214 and/or the electronic data storage unit 215 optionally may be in electronic communication with a wafer inspection tool, a wafer metrology tool, or a wafer review tool (not illustrated) to receive additional information or send instructions. For example, the processor 214 and/or the electronic data storage unit 215 can be in electronic communication with an SEM.

The processor 214, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 214 and electronic data storage unit 215 may be disposed in or otherwise part of the system 200 or another device. In an example, the processor 214 and electronic data storage unit 215 may be part of a standalone control unit or in a centralized quality control unit. Multiple processors 214 or electronic data storage units 215 may be used.

The processor 214 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 214 to implement various methods and functions may be stored in readable storage media, such as a memory in the electronic data storage unit 215 or other memory.

If the system 200 includes more than one processor 214, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 214 may be configured to perform a number of functions using the output of the system 200 or other output. For instance, the processor 214 may be configured to send the output to an electronic data storage unit 215 or another storage medium. The processor 214 may be further configured as described herein.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 214 may be configured according to any of the embodiments described herein. The processor 214 also may be configured to perform other functions or additional steps using the output of the system 200 or using images or data from other sources.

Various steps, functions, and/or operations of system 200 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 214 or, alternatively, multiple processors 214. Moreover, different subsystems of the system 200 may include one or more computing or logic systems. Therefore, the above description should not be interpreted as a limitation on the present disclosure but merely an illustration.

The deep learning classification module 216 can perform the methods disclosed herein, such as the methods illustrated in FIG. 2, 3, or 6. In an instance, the deep learning classification module 216 is in communication with the system 200. The deep learning classification module 216 is configured to receive a plurality of images of specimen 202 (e.g., a semiconductor wafer) via the interface module 217. Defects on the images are sorted into a plurality of soft decisions using the deep learning classification module 216. Each of the soft decisions is for a DOI type. The deep learning classification module 216 can apply a weight to each of the soft decisions thereby determining a value for each of the soft decisions. The weight may be adjustable, and a number of the images in the class changes as the weight is adjusted. The deep learning classification module 216 also can determine a class of the DOI for the image based on the value.

The deep learning classification module 216 may be further configured to normalize the soft decisions thereby determining normalized soft decisions. The weight can be applied to the soft decision by multiplying the normalized soft decisions by the weight corresponding to the soft decision. The deep learning classification module can determine the class of the DOI by adding the value for each of the soft decisions thereby determining a summation and determining if the summation has a largest value among all the classes. The summation with the largest value is the class for the DOI.

An additional embodiment relates to a non-transitory computer-readable medium storing program instructions executable on a controller for performing a computer-implemented method for classification of defects, as disclosed herein. In particular, as shown in FIG. 5, electronic data storage unit 215 or other storage medium may contain non-transitory computer-readable medium that includes program instructions executable on the processor 214. The computer-implemented method may include any step(s) of any method(s) described herein, including method 100.

Program instructions implementing methods such as those described herein may be stored on computer-readable medium, such as in the electronic data storage unit 215 or other storage medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

The component(s) executed by the processor, can include a deep learning classification module (e.g., a convolutional neural network (CNN) module). The deep learning classification module can have one of the configurations described further herein. Rooted in neural network technology, deep learning is a probabilistic graph model with many neuron layers, commonly known as a deep architecture. Deep learning technology processes the information such as image, text, voice, and so on in a hierarchical manner. In using deep learning in the present disclosure, feature extraction is accomplished automatically using learning from data. For example, defects can be classified, sorted, or binned using the deep learning classification module based on the one or more extracted features.

Generally speaking, deep learning (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a deep network, there are many layers between the input and output, allowing the algorithm to use multiple processing layers, composed of multiple linear and non-linear transformations.

Deep learning is part of a broader family of machine learning methods based on learning representations of data. An observation (e.g., a feature to be extracted for reference) can be represented in many ways such as a vector of intensity values per pixel, or in a more abstract way as a set of edges, regions of particular shape, etc. Some representations are better than others at simplifying the learning task (e.g., face recognition or facial expression recognition). Deep learning can provide efficient algorithms for unsupervised or semi-supervised feature learning and hierarchical feature extraction.

Research in this area attempts to make better representations and create models to learn these representations from large-scale data. Some of the representations are inspired by advances in neuroscience and are loosely based on interpretation of information processing and communication patterns in a nervous system, such as neural coding which attempts to define a relationship between various stimuli and associated neuronal responses in the brain.

There are many variants of neural networks with deep architecture depending on the probability specification and network architecture, including, but not limited to, Deep Belief Networks (DBN), Restricted Boltzmann Machines (RBM), and Auto-Encoders. Another type of deep neural network, a CNN, can be used for feature analysis. The actual implementation may vary depending on the size of input images, the number of features to be analyzed, and the nature of the problem. Other layers may be included in the deep learning classification module besides the neural networks disclosed herein.

In an embodiment, the deep learning model is a machine learning model. Machine learning can be generally defined as a type of artificial intelligence (AI) that provides computers with the ability to learn without being explicitly programmed. Machine learning focuses on the development of computer programs that can teach themselves to grow and change when exposed to new data. Machine learning explores the study and construction of algorithms that can learn from and make predictions on data. Such algorithms overcome following strictly static program instructions by making data driven predictions or decisions, through building a model from sample inputs.

In some embodiments, the deep learning model is a generative model. A generative model can be generally defined as a model that is probabilistic in nature. In other words, a generative model is one that performs forward simulation or rule-based approaches. The generative model can be learned (in that its parameters can be learned) based on a suitable training set of data. In one embodiment, the deep learning model is configured as a deep generative model. For example, the model may be configured to have a deep learning architecture in that the model may include multiple layers, which perform a number of algorithms or transformations.

In another embodiment, the deep learning model is configured as a neural network. In a further embodiment, the deep learning model may be a deep neural network with a set of weights that model the world according to the data that it has been fed to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically consist of multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

In one embodiment, the deep learning model used for the semiconductor inspection applications disclosed herein is configured as an AlexNet. For example, an AlexNet includes a number of convolutional layers (e.g., 5) followed by a number of fully connected layers (e.g., 3) that are, in combination, configured and trained to analyze features for determining rotation and translation offsets. In another such embodiment, the deep learning model used for the semiconductor inspection applications disclosed herein is configured as a GoogleNet. For example, a GoogleNet may include layers such as convolutional, pooling, and fully connected layers such as those described further herein configured and trained to analyze features for determining rotation and translation offsets. While the GoogleNet architecture may include a relatively high number of layers (especially compared to some other neural networks described herein), some of the layers may be operating in parallel, and groups of layers that function in parallel with each other are generally referred to as inception modules. Other of the layers may operate sequentially. Therefore, GoogleNets are different from other neural networks described herein in that not all of the layers are arranged in a sequential structure. The parallel layers may be similar to Google's Inception Network or other structures.

In a further such embodiment, the deep learning model used for the semiconductor inspection applications disclosed herein is configured as a Visual Geometry Group (VGG) network. For example, VGG networks were created by increasing the number of convolutional layers while fixing other parameters of the architecture. Adding convolutional layers to increase depth is made possible by using substantially small convolutional filters in all of the layers. Like the other neural networks described herein, VGG networks were created and trained to analyze features for determining rotation and translation offsets. VGG networks also include convolutional layers followed by fully connected layers.

In some such embodiments, the deep learning model used for the semiconductor inspection applications disclosed herein is configured as a deep residual network. For example, like some other networks described herein, a deep residual network may include convolutional layers followed by fully-connected layers, which are, in combination, configured and trained for feature property extraction. In a deep residual network, the layers are configured to learn residual functions with reference to the layer inputs, instead of learning unreferenced functions. In particular, instead of hoping each few stacked layers directly fit a desired underlying mapping, these layers are explicitly allowed to fit a residual mapping, which is realized by feedforward neural networks with shortcut connections. Shortcut connections are connections that skip one or more layers. A deep residual net may be created by taking a plain neural network structure that includes convolutional layers and inserting shortcut connections which thereby takes the plain neural network and turns it into its residual learning counterpart.

In a further such embodiment, the deep learning model used for the semiconductor inspection applications disclosed herein includes one or more fully connected layers configured for analyzing features for determining rotation and translation offsets. A fully connected layer may be generally defined as a layer in which each of the nodes is connected to each of the nodes in the previous layer. The fully connected layer(s) may perform classification based on the features extracted by convolutional layer(s), which may be configured as described further herein. The fully connected layer(s) are configured for feature selection and classification. In other words, the fully connected layer(s) select features from a feature map and then analyze the input image(s) based on the selected features. The selected features may include all of the features in the feature map (if appropriate) or only some of the features in the feature map.

In some embodiments, the information determined by the deep learning model includes feature properties extracted by the deep learning model. In one such embodiment, the deep learning model includes one or more convolutional layers. The convolutional layer(s) may have any suitable configuration known in the art. In this manner, the deep learning model (or at least a part of the deep learning model) may be configured as a CNN. For example, the deep learning model may be configured as a CNN, which is usually stacks of convolution and pooling layers, to extract local features. The embodiments described herein can take advantage of deep learning concepts such as a CNN to solve the normally intractable representation inversion problem. The deep learning model may have any CNN configuration or architecture known in the art. The one or more pooling layers may also have any suitable configuration known in the art (e.g., max pooling layers) and are generally configured for reducing the dimensionality of the feature map generated by the one or more convolutional layers while retaining the most important features.

In general, the deep learning model described herein is a trained deep learning model. For example, the deep learning model may be previously trained by one or more other systems and/or methods. The deep learning model is already generated and trained and then the functionality of the model is determined as described herein, which can then be used to perform one or more additional functions for the deep learning model.

As stated above, although a CNN is used herein to illustrate the architecture of a deep learning system, the present disclosure is not limited to a CNN. Other variants of deep learning architectures may be used in embodiments. For example, Auto-Encoders, DBNs, and RBMs, can be used. Random forests also can be used.

Training data may be inputted to model training (e.g., CNN training), which may be performed in any suitable manner. For example, the model training may include inputting the training data to the deep learning model (e.g., a CNN) and modifying one or more parameters of the model until the output of the model is the same as (or substantially the same as) external validation data. Model training may generate one or more trained models, which may then be sent to model selection, which is performed using validation data. The results that are produced by each one or more trained models for the validation data that is input to the one or more trained models may be compared to the validation data to determine which of the models is the best model. For example, the model that produces results that most closely match the validation data may be selected as the best model. Test data may then be used for model evaluation of the model that is selected (e.g., the best model). Model evaluation may be performed in any suitable manner. Best model may also be sent, to model deployment in which the best model may be sent to the semiconductor inspection tool for use (post-training mode).

While the deep learning classification module can classify or identify defects, a user may need to group desired class codes in each bin. The deep learning classification module can be trained with training images of defects.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
an interface module in electronic communication with a wafer inspection tool; and
a deep learning classification module in electronic communication with the interface module, wherein the deep learning classification module is configured to:
receive a plurality of images of a semiconductor wafer via the interface module;
sort defects on the images into a plurality of soft decisions, wherein each of the soft decisions is for a defect of interest type;
normalize the soft decisions thereby determining normalized soft decisions;
apply a weight to each of the soft decisions thereby determining a value for each of the soft decisions, wherein the weight is applied to the soft decision by multiplying the normalized soft decisions by the weight corresponding to the soft decision; and
determine a class of the defect of interest for the image based on the value.

2. The system of claim 1, further comprising the wafer inspection tool, wherein the wafer inspection tool is configured to generate the images.

3. The system of claim 2, wherein the wafer inspection tool is one of an optical wafer inspection tool or an electron beam wafer inspection tool.

4. The system of claim 2, wherein the wafer inspection tool includes a stage that holds a semiconductor wafer and a detector.

5. The system of claim 1, wherein the deep learning classification module is trained with a training set of defects of interest.

6. The system of claim 1, wherein the deep learning classification module determines the class of the defect of interest by:
adding the value for each of the soft decisions thereby determining a summation; and
determining if the summation has a largest value among all the classes whereby the summation with the largest value is the class for the defect of interest.

7. The system of claim 1, wherein the deep learning classification module is further configured such that the weight is adjustable.

8. A method comprising:
receiving a plurality of images of a semiconductor wafer at a deep learning classification module;
sorting defects on the images into a plurality of soft decisions with the deep learning classification module, wherein each of the soft decisions is for a defect of interest type;
normalizing the soft decisions with the deep learning classification module thereby determining normalized soft decisions;
applying a weight to each of the soft decisions using the deep learning classification module by multiplying the normalized soft decisions by the weight corresponding to the soft decision thereby determining a value;
determining, using the deep learning classification module, a class of the defect of interest for the image based on the value.

9. The method of claim 8, further comprising training the deep learning classification module with a training set of defects of interest.

10. The method of claim 8, wherein the determining includes:
adding the value for each of the soft decisions thereby determining a summation; and
determining if the summation has a largest value among all the classes whereby the summation with the largest value is the class for the defect of interest.

11. The method of claim 8, further comprising adjusting the weight.

12. The method of claim 11, wherein a number of the images in the class changes as the weight is adjusted.

13. The method of claim 8, further comprising generating the images of the semiconductor wafer with an optical inspection tool.

14. A non-transitory computer readable medium storing a program configured to instruct a processor to execute the method of claim 8.

* * * * *